Andrew McCollam's Plow Clevis.

117187  PATENTED JUL 18 1871

Witnesses.
H. K. Ellsworth
A. C. Rawlings

Inventor.
Andrew McCollam
By Hill & Ellsworth
Attys.

UNITED STATES PATENT OFFICE.

ANDREW McCOLLAM, OF NEW ORLEANS, LOUISIANA.

IMPROVEMENT IN PLOW-CLEVISES.

Specification forming part of Letters Patent No. 117,187, dated July 18, 1871.

*To all whom it may concern:*

Be it known that I, ANDREW MCCOLLAM, of the city of New Orleans, in the parish of Orleans and State of Louisiana, have invented an Improved Clevis for Plows; and I do hereby declare the following to be a full, clear, and exact description of the same, reference being had to the accompanying drawing forming part of this specification, in which—

Figure 1:
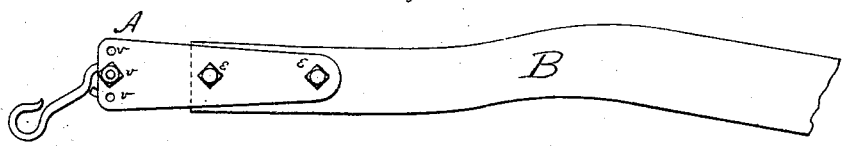
Figure 2:
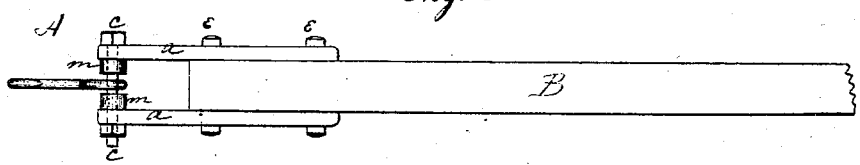
Figure 3:
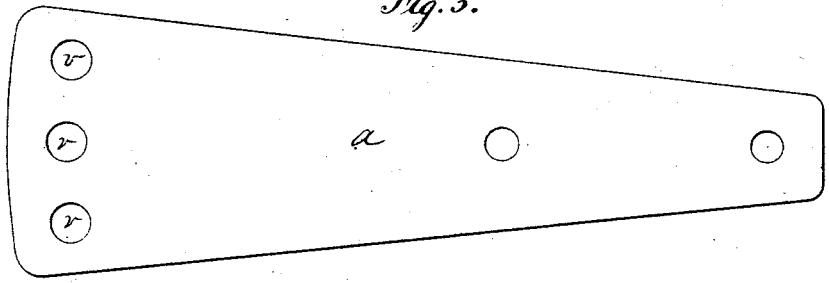
Figure 4:
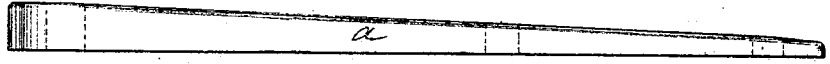

Figure 1 is a side elevation, showing the clevis attached to the beam; Fig. 2, a plan of the same; Fig. 3, an elevation showing one of the side plates detached; and Fig. 4, an edge view of the same.

Similar letters in the drawing denote corresponding parts.

This invention consists in an improved form of clevis to regulate the depth of furrow, together with adjusting washers or rings to regulate the width of the furrows, as hereinafter set forth.

In the drawing, A is the clevis, and B the plow-beam. The clevis is composed of two iron plates, $a\ a$, of the form shown in Fig. 3, bolted through the plow-beam at $e\ e$, as shown in Figs. 1 and 2, and provided with a series of holes, $v\ v\ v$, in any one of which may be secured the pin $c$ to which the draft is applied, so that by adjusting said pin in the different holes the depth of the furrow may be regulated at pleasure. To regulate the width of the furrow-slice one or more rings or washers, $m\ m$, are applied to the pin $c$, and by adjusting them to the right or left of the draft-chain the object is accomplished.

This improved clevis secures superior strength, durability, steadiness of draft, and economy of construction, and does away with the wearing of the beam by the land-pin, so common in the ordinary clevis, while its permanent attachment to the plow secures it from any danger of loss.

Having thus described my invention, what I claim as new therein, and desire to secure by Letters Patent, is—

The clevis A, provided with the adjusting-rings $m\ m$, substantially as and for the purposes specified.

ANDREW McCOLLAM.

Witnesses:
R. S. SIMS,
A. W. CONNELY.